United States Patent [19]
Giese et al.

[11] Patent Number: 5,611,584
[45] Date of Patent: Mar. 18, 1997

[54] AUTOMATIC POSITIVE HOOD SAFETY LOCK

[75] Inventors: Ludi Giese, Redmond; Randell J. Lettau, North Bend, both of Wash.

[73] Assignee: Paccar Inc, Bellevue, Wash.

[21] Appl. No.: 269,168

[22] Filed: Jun. 30, 1994

[51] Int. Cl.$^6$ ............................................... E05C 17/44
[52] U.S. Cl. ................................ 292/338; 292/DIG. 14; 16/292
[58] Field of Search ................................ 292/338, 339, 292/DIG. 17, DIG. 43, DIG. 14, 194, 198, 219, 229, 300; 16/289, 292; 180/69.2

[56] References Cited

U.S. PATENT DOCUMENTS

| | | | |
|---|---|---|---|
| 2,215,606 | 9/1940 | Dunn | 292/DIG. 14 X |
| 2,262,487 | 11/1941 | Birr et al. | 16/292 X |
| 2,922,184 | 1/1960 | Bogater | 16/289 X |
| 3,039,557 | 6/1962 | Boyce et al. | 16/289 X |
| 4,134,179 | 1/1979 | Silaghi | 292/DIG. 14 X |
| 4,530,412 | 7/1985 | Sigety, Jr. | 292/DIG. 14 X |
| 4,587,760 | 5/1986 | Brissette | 16/289 X |

FOREIGN PATENT DOCUMENTS

| | | | |
|---|---|---|---|
| 2401296 | 4/1979 | France | 16/289 |

OTHER PUBLICATIONS

Drawing with description and photographs of safety hood latch.

*Primary Examiner*—Rodney M. Lindsey
*Attorney, Agent, or Firm*—Seed and Berry LLP

[57] ABSTRACT

The invention relates to an apparatus which automatically locks the hood of a vehicle in a position which allows access to the engine. The invention includes a swing arm which is spring loaded and pivotally connected to the support structure of the vehicle, like the vehicle frame, near the hood hinge and away from the engine. When the hood is opened and the hood hinge pivots, the swing arm automatically follows the hood hinge until the swing arm reaches a position which prevents the hood hinge from pivoting in a direction which would result in the hood closing. In this way the invention automatically locks the hood to prevent premature hood closure which could injure the driver or maintenance personnel.

7 Claims, 3 Drawing Sheets

AUTOMATIC POSITIVE HOOD SAFETY LOCK

TECHNICAL FIELD

This invention relates to an automatic safety lock for the hood of a vehicle. More particularly, the invention relates to a hood safety lock which automatically locks the hood in an open position when access to the vehicle engine or related components is desired.

BACKGROUND OF THE INVENTION

Various devices have been created to secure the hood of a vehicle in an open position in order to allow the operator or maintenance personnel safe access to the engine. That is, personnel can work on the engine without fear of the hood, which is often very heavy especially on larger vehicles like a truck, from prematurely closing on the limbs or body of the personnel. For example, the prior art includes use of a safety cable fixed to the hood of a truck. After the operator or maintenance personnel lifts the hood, they can attach the cable which will become taut when the hood moves approximately more than halfway closed. However, the safety cable must be manually attached to the engine when the hood is fully opened. If the operator forgets to do this, he risks serious danger. Likewise, if the truck breaks down at night, the operator could burn his hands attempting to find the location on the engine where the safety cable can be latched. Another solution to the problem of premature hood closure includes use of a flat long bar which is fixed on one end to the hood. As the hood is opened, the bar slides along a guide until a notch on the bottom side of the bar drops into a slot. The notch locks the hood in an open position. The maintenance personnel can then lift the bar to release the hood upon completing the maintenance to the engine or related components. This solution takes an extraordinary amount of space due to the travel associated with the hood. That is, the bar must be exceptionally long, approximately two feet or longer. Additionally, to retrofit existing trucks with this safety device requires cutting existing structure to facilitate the bar as well as adding structure like a hinge bolt. Furthermore, the notch in the support bar can be rendered ineffective by dirt, ice, or other contaminants associated with the working environment of a vehicle. Moreover, the maintenance personnel may pinch or cut their hand when pulling the flat bar out of the slot upon attempting to close the hood.

SUMMARY OF THE INVENTION

The present invention is a compact automatic lock with a resetting mechanism. It is located away from the engine and is designed to replace an existing bracket at a location where the hood hinge is pivotally connected to the vehicle frame. Consequently, the present invention can be readily adapted to existing trucks because it is designed to replace existing support brackets for the hood hinge. When the hood is open, the hood hinge pivots forward. The invention automatically falls into the gap left by the hood hinge moving forward. Therefore, without any assistance from the maintenance personnel or vehicle driver when the hood is opened, the invention automatically prevents the hood from returning to a closed position. The invention is located where the hood hinge is secured to a structural member of the vehicle typically located away from the engine. Since the hood safety lock is located away from the engine, there is little chance that the operator or maintenance personnel will burn their limbs. Moreover, when the maintenance personnel or driver of the vehicle closes the hood, the invention automatically resets. That is, when the hood is opened again, the invention will automatically prevent the hood from closing.

Therefore, it is an object of the invention to have a hood safety lock which automatically deploys when the hood is opened. Therefore, forgetfulness of the operator or maintenance personnel will not result in injury. Likewise, it is an object of the invention to be located away from the engine. This prevents the driver or maintenance personnel from burning their limbs when resetting the invention. It is also an object of the invention to have a lock which automatically resets. Moreover, it is an object of the invention to be readily adaptable to the structure of existing vehicles, thereby allowing easy and cost-effective retrofit. Furthermore, it is an object of the invention to be compact and lightweight.

BRIEF DESCRIPTION OF THE DRAWINGS

Other objects and a fuller understanding of the invention may be had by referring to the following description and claims, taken in conjunction with the accompanying drawings in which:

DETAILED DESCRIPTION OF THE INVENTION

Figure 1A:
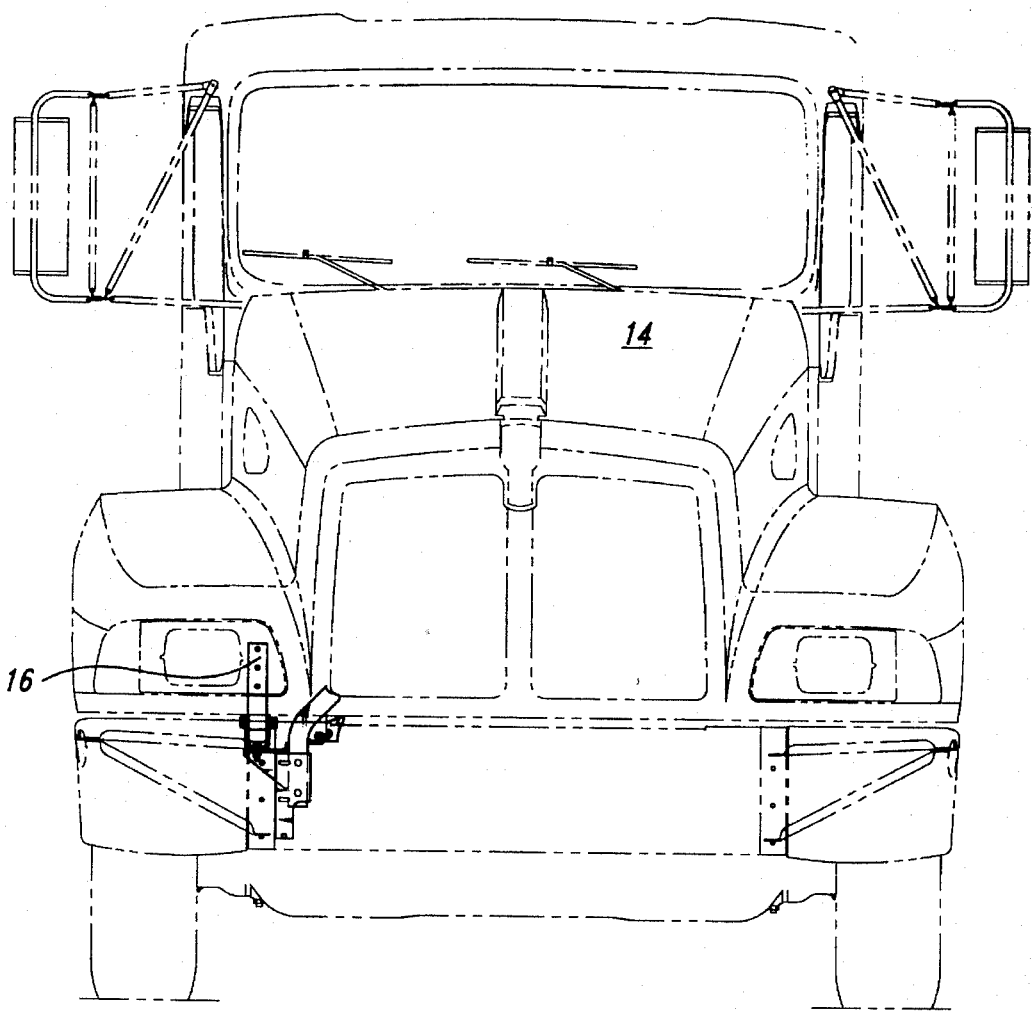
FIG. 1A is a front view of the invention installed in a truck.

Referring now to the drawings for a better understanding of the invention. FIG. 1A shows the invention installed in a truck. In a broad sense, the invention comprises an automatic hood safety lock for a vehicle. FIG. 1A demonstrates that the invention is located away from the engine. Typically, as shown in FIG. 1A, the invention will be located under the hood 14 where the hood hinge 16 is located.

Figure 1B:
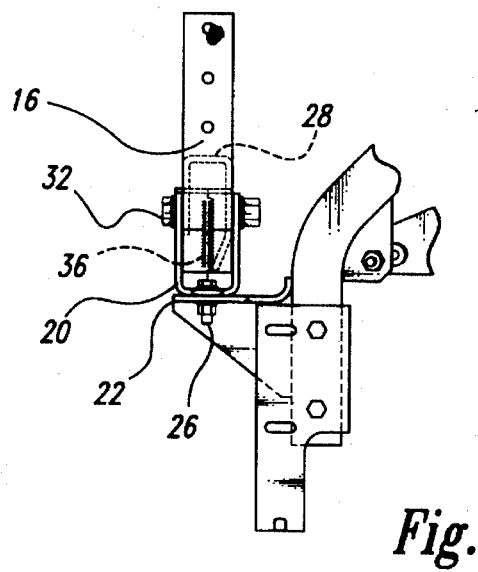
FIG. 1B is a front view of the invention attached to a vehicle frame.

As will be observed in FIG. 1B, the invention is anchored to the vehicle frame 22 through use of bolt 26. Therefore, the support bracket 20 remains fixed in relation to the vehicle frame 22. The vehicle frame 22 can be any stationary support structure associated with the vehicle.

Figure 2:
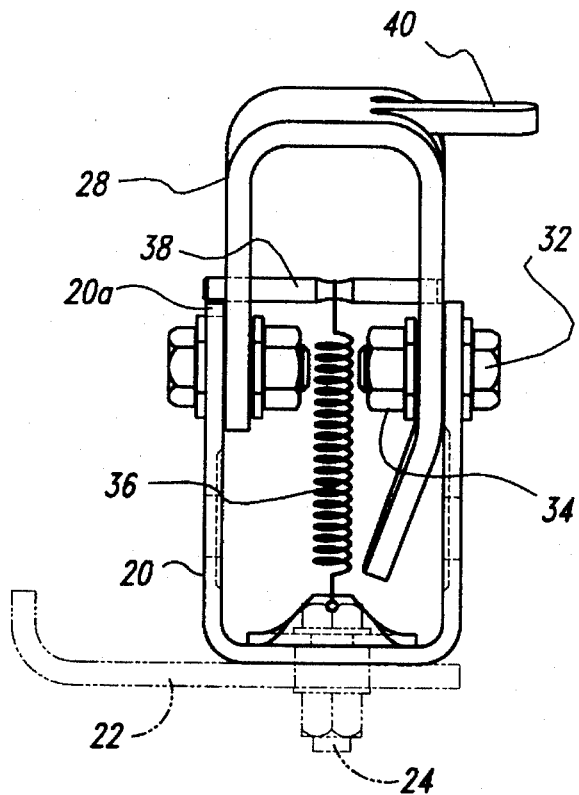
FIG. 2 is a rear view of the invention.
Figure 3:
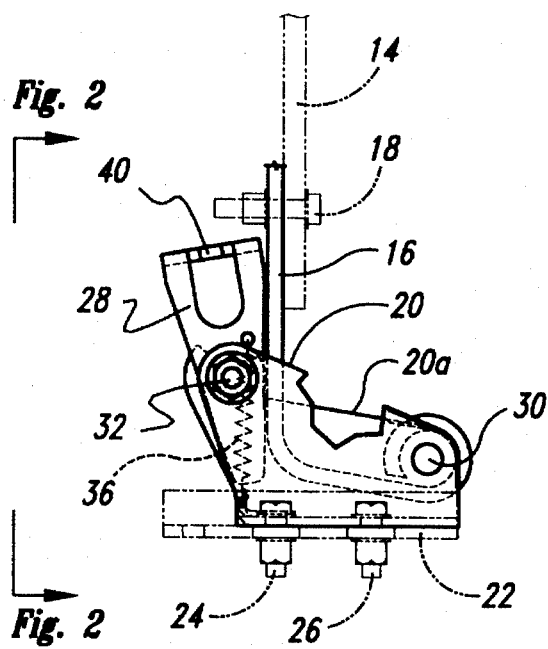
FIG. 3 is a side view of the invention when the hood is closed.
Figure 4:
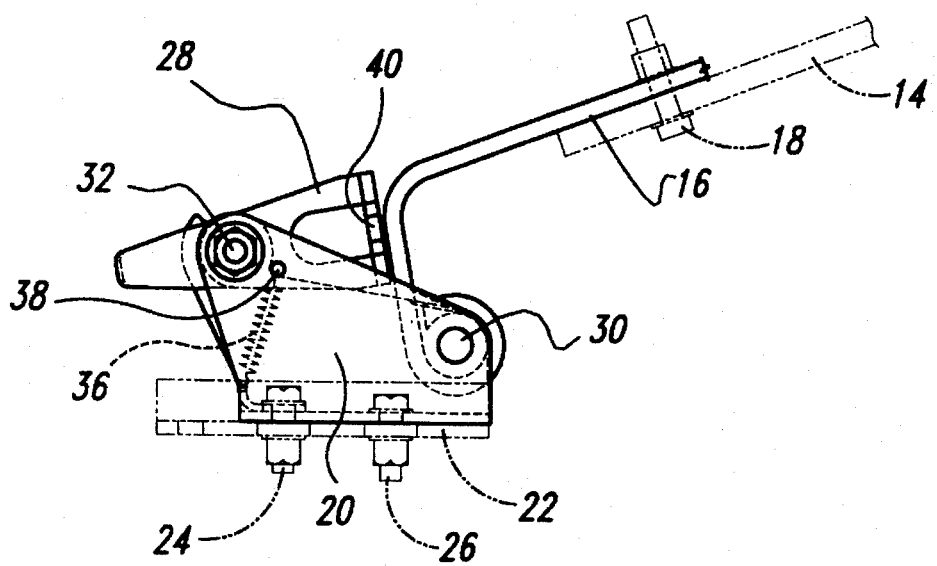
FIG. 4 is a side view of the invention when the hood is in an open position and the invention prevents the hood from closing.

From FIG. 2 it can be seen that the swing arm 28 is connected to the support bracket 20 by use of the swing arm pivot pin 32. The swing arm pivot pin 32 allows the swing arm 28 to pivot fore and aft. To facilitate the pivotal motion, a pin 38 is secured to the swing arm 28 and is spring loaded by a spring 36. The spring 36 is anchored to the support bracket 20 at the lower end. The point where the spring 36 is connected to the support bracket 20 is slightly forward (to the right as viewed in FIG. 3) of the pivot pin 32. This results in a tension force drawing the swing arm 28 toward the hood hinge 16 (not shown in FIG. 2). This facilitates the automatic action of the invention. That is, as the hood 14 is opened and the hood hinge 16 moves as a result that it is fastened to the hood 14 by bolt 18 as shown in FIG. 3, the swing arm 28 also moves in the same direction until it is in a locked position as shown in FIG. 4. The tension force will also result in an audible noise as the swing arm 28 comes to rest when the hood 14 is opened. The noise informs the driver or maintenance that the invention is deployed and that the hood 14 is locked. The noise can be electronically generated with electrical amplification equipment and proximity sensors informing the driver or maintenance personnel that the swing arm 28 is in a locked position. Alternately, the noise can be made with a simple mechanical device, for example, by using a spring 36 which has sufficient tension to cause the pin 38 to contact the support bracket 20 with sufficient force when the hood 14 is opened resulting in an audible noise. As shown in Figures of the drawing, the swing arm 28 pivots in the plane of movement of the hood hinge 16 and thus moves into the area vacated by the hood hinge when the hood is moving from the closed to the open position.

Figure 5:
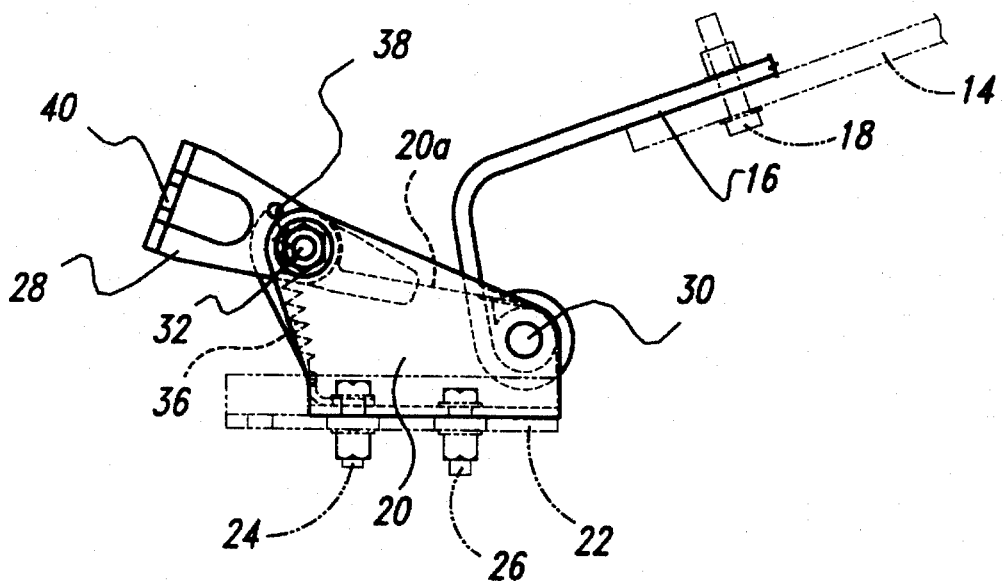
FIG. 5 is a side view of the invention when the hood is in an open position and the invention is unlocked allowing the hood to be closed.

In FIG. 2, the pin 38 can be seen to extend beyond the swing arm 28 on one side. This prevents the swing arm 28 from tailing too far when the hood hinge 16 is in an open position as shown in FIG. 4. The bracket 20 has one side 20a with a top edge lower than the top edge of the other side of the bracket as shown in the figures and more clearly in FIG. 3. The pin 38 follows the contour of the lower side 20a of the support bracket 20, shown by hidden lines in FIG. 4, until the swing arm 28 is in a locked position. Likewise, the extension of pin 38 also prevents the swing arm 28 from pivoting too far when the lock is manually released to close the hood 14 as shown in FIG. 5. That is, the lower side 20a of the support bracket 20 acts as a stop for the extension of pin 38.

As will be observed from FIG. 3, the swing arm 28 is positioned against the hood hinge 16 when the hood 14 is closed. As discussed earlier, the fact that the spring 36 is slightly angled results in a tension force causing the swing arm 28 to be pressed against the hood hinge 16. Many different types of springs can be utilized to create the tension force. For example, a coil spring concentric about pin 32, a comb disk spring, or any other resilient biasing member can be used to cause the swing arm 28 to be rotated when the hood is opened. Therefore, as the hood 14 is opened and the hood hinge 16 is thereby pivoted around hinge pivot pin 30, the spring 36 causes the swing arm 28 to move forward pivoting about the swing arm pivot pin 32. As a result, the swing arm 28 is pulled forward by the spring 36 as the hood hinge 16 is pivoted around the hinge pivot pin 30. The swing arm 28 continues to move forward until the extension of pin 38 comes to rest against the support bracket 20. This can be seen in FIG. 4. With the swing arm 28 in the locked position shown in FIG. 4, the hood 14 cannot be closed. That is, should the wind blow against the hood 14 or should maintenance personnel try to close the hood 14 while someone is working on the vehicle 12, the swing arm 28 will prevent the hood hinge 16 from moving. Since the hood hinge 16 is fastened to the hood 14 through hood fastener 18, the hood 14 cannot close. When the repairs are complete, or the maintenance personnel or driver has completed inspection of the engine, they can release the swing arm from a locked position by merely grabbing finger 40 shown in FIG. 2 and gently pulling upward. This will place the swing arm 28 to a reset position shown in FIG. 5. When the hood 14 is closed, the hood hinge 16 will contact the bottom of the swing arm 28 causing the swing arm to automatically return to the ready position shown in FIG. 3. That is, the invention will automatically return to the ready position so that when the hood 14 is again opened, the invention will automatically return to the locked position shown in FIG. 4, thereby preventing premature closure of the hood 14. In this way, there is no possible way that safety can be compromised by forgetfulness of the maintenance personnel or driver.

As can be seen from FIG. 4, when the invention is in a locked position with the hood 14 open, significant forces will be absorbed by the swing arm 28, swing arm pivot pin 32, the support bracket 20, and the hinge pivot pin 30. Therefore, the material of these parts should be of sufficient strength to withstand forces associated with wind blowing against the open hood 14, or alternately, the forces associated with a maintenance personnel or driver attempting to close the hood 14 when the invention is in a locked position. Typically, the invention will be manufactured from steel, but the actual material used will depend on the size of the vehicle and corresponding size of the hood.

Although the invention has been described in its preferred form with a certain degree of particularity, it is understood that the present disclosure of the preferred form has been made only by way of example and numerous changes in the details of the construction as well as the combination and arrangements of the parts may be resorted to without departing from the spirit and the scope of the invention as hereinafter claimed.

What is claimed is:

1. An apparatus tier automatically locking a hood of a vehicle in a position which allows access to an engine comprising:

a support bracket fixed to said vehicle;

a hood hinge secured to said hood and said vehicle allowing relative motion between said hood and said vehicle along a path of movement from a closed position to an open position to allow access to the engine; and a swing arm pivotally coupled to said support bracket and located to pivot into a position in the path of movement of the hood which blocks said relative motion between the hood and the vehicle to block said hood against returning to a closed position when said hood is opened to provide access to said engine.

2. The apparatus in claim 1, further including means for stopping said swing arm in a position which prevents said hood from closing when said hood is moved to allow access to said engine and means for stopping said swing arm in a position which automatically places said swing arm in a reset position.

3. The apparatus in claim 1, further including means for making an audible noise when said swing arm moves from a ready position to a locked position.

4. The apparatus in claim 1 wherein said swing arm pivots in the plane of movement of the hinge into the space vacated by the hinge as the hood is opened.

5. The apparatus of claim 4 wherein said swing arm is elongated on one end to make contact with said hood hinge when said hood is returned to a closed position such that said swing arm will rest against the hinge and be positioned to automatically return to a position to prevent said hood from returning to a closed position upon re-opening said hood.

6. An apparatus for automatically locking the hood of a vehicle in an open position which allows access to an engine comprising:

a vehicle frame;

a swing arm pivotally connected to said vehicle frame and having a hood-open-blocking position that positions the arm into the path of movement of the hood to block movement of the hood when the hood is in an open position but does not normally support the hood when the hood is in the open position, said swing arm freely movable out of said hood-open-blocking position while the hood remains open; and spring means for forcing said swing arm to change orientation automatically into said hood-open blocking position upon said hood being moved to the open position to allow access to said engine.

7. An apparatus for automatically locking a hood of a vehicle in an open position which allows access to an engine comprising:

a swing arm pivotally coupled to said vehicle and positioned to allow free movement of the hood into an open position but to pivot into a blocking position into the path of movement of the hood which prevents motion of said hood returning to a closed position when said hood is opened to provide access to said engine, the swing arm normally not supporting the hood when the hood is in the open position and said swing arm freely movable out of said hood-open-blocking position while the hood remains open; and a spring forcing said swing arm to pivot automatically into the blocking position when said hood is opened to allow access to said engine.

* * * * *

UNITED STATES PATENT AND TRADEMARK OFFICE
CERTIFICATE OF CORRECTION

PATENT NO. : 5,611,584
DATED : March 18, 1997
INVENTOR(S) : Ludi Giese and Randell J. Lettau It is certified that error appears in the above-indentified patent and that said Letters Patent is hereby corrected as shown below:

In column 4, claim 1, line 24, please delete "tier" and insert therefor --for--.

Signed and Sealed this

Fourteenth Day of October, 1997

Attest:

BRUCE LEHMAN

Attesting Officer

Commissioner of Patents and Trademarks